US011343676B1

(12) United States Patent
Zhang

(10) Patent No.: US 11,343,676 B1
(45) Date of Patent: May 24, 2022

(54) CONFIGURING DEVICES TO CONNECT TO A NETWORK

(71) Applicant: Amazon Technologies, Inc., Seattle, WA (US)

(72) Inventor: Yangfan Zhang, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/296,107

(22) Filed: Mar. 7, 2019

(51) Int. Cl.
*H04W 12/069* (2021.01)
*H04L 41/0806* (2022.01)
*H04W 12/04* (2021.01)
*H04W 12/06* (2021.01)

(52) U.S. Cl.
CPC ....... *H04W 12/069* (2021.01); *H04L 41/0806* (2013.01); *H04W 12/04* (2013.01); *H04W 12/068* (2021.01)

(58) Field of Classification Search
CPC ......... H04W 12/0609; H04W 12/0608; H04W 12/04; H04L 41/0806
See application file for complete search history.

(56) References Cited

U.S. PATENT DOCUMENTS

| 10,547,613 | B1 * | 1/2020 | Roths | G06F 21/57 |
| 2008/0126957 | A1 * | 5/2008 | Tysowski | G06F 9/44505 715/764 |
| 2015/0271669 | A1 * | 9/2015 | Okubo | G06F 21/30 726/7 |
| 2016/0284206 | A1 * | 9/2016 | Boettcher | A01N 1/021 |
| 2017/0126512 | A1 * | 5/2017 | Seed | H04L 41/0806 |
| 2019/0364470 | A1 * | 11/2019 | Chen | H04W 36/0058 |
| 2019/0379518 | A1 * | 12/2019 | Yang | H04L 1/1812 |
| 2019/0394643 | A1 * | 12/2019 | Town | H04W 48/20 |

* cited by examiner

*Primary Examiner* — Jianye Wu
(74) *Attorney, Agent, or Firm* — Davis Wright Tremaine LLP

(57) ABSTRACT

A technology is described for connecting an unconfigured device to a wireless network using network credentials obtained via a configurator device. An example of the technology may include activating a configurator service on a device to allow the device to act as a configurator device and provide network credentials of a wireless network to unconfigured devices. The configurator device may receive a connection request from an unconfigured device to obtain the network credentials to enable the unconfigured device to connect to the wireless network. The configurator device may determine that the unconfigured device is authorized to connect to the wireless network, obtain the network credentials from a credential provisioning service, and send the network credentials to the unconfigured device to enable the unconfigured device to connect to the wireless network.

22 Claims, 10 Drawing Sheets

CONFIGURING DEVICES TO CONNECT TO A NETWORK

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of a building's heating, cooling, and ventilation systems. Home automation devices also offer the possibility of being configured with communication capabilities for the purpose of transmitting status and receiving external control communications. Quite often, these electronic devices communicate by connecting to a wireless network and sending data over the wireless network.

DETAILED DESCRIPTION

Figure 1:
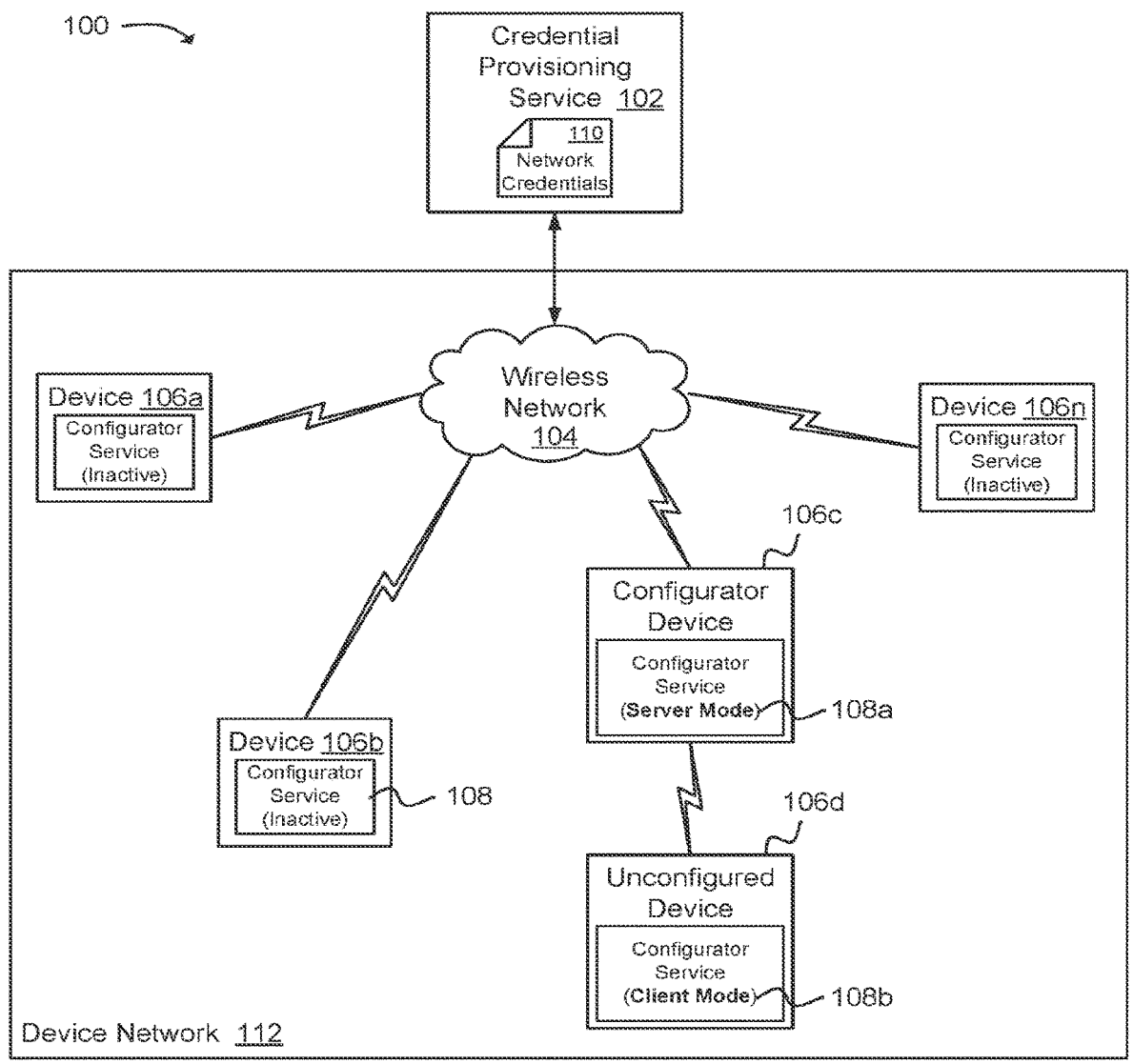
FIG. 1 is a block diagram illustrating an example system used to automate configuration of an unconfigured device to connect to a wireless network via a configurator device.

Technologies are described for connecting an unconfigured device to a wireless network using network credentials obtained via a configurator device. In one example, devices configured to execute primary functionality associated with, for example, Internet of Things (IoT) devices, may execute configuration functionality associated with connecting an unconfigured device to a wireless network. More specifically, in addition to performing a primary function, a device may host a configurator service used to obtain network credentials from a centralized credential provisioning service. The configurator service may include a server mode and a client mode. The server mode of the configurator service may be executed by a device (referred to as a "configurator device") connected to a wireless network to obtain network credentials for the wireless network and provide the network credentials to an unconfigured device which is not configured to connect to the wireless network. The client mode of the configurator service may be executed by a device not configured to connect to a wireless network (referred to as an "unconfigured device") to request network credentials for the wireless network from a configurator device executing the server mode of the configurator service. Network credentials for a wireless network may include, but are not limited to: a service set identifier (SSID), a username, password, security token, digital certificate, and other types of credentials.

In one example, an unconfigured device may activate the client mode of the configurator service and search for a configurator device broadcasting a configurator identifier (e.g., a service set identifier (SSID) or network name) and send a connection request to the configurator device. The server mode of the configurator service may be configured to broadcast a predefined default configurator identifier, and the client mode of the configurator service may be configured to search for the predefined default configurator identifier. In response to receiving the connection request, the configurator device may send a configurator certificate to the unconfigured device, and the unconfigured device may validate the configurator certificate using a pre-provisioned certificate stored on the unconfigured device. The unconfigured device may then send a device certificate to the configurator device, and the configurator device may use the device certificate to authenticate the unconfigured device. After successful authentication, the configurator device may obtain network credentials for a local wireless network from a credential provisioning service hosted in a service provider environment (e.g., a "cloud" environment) or within a device network that includes the devices. The configurator device may send the network credentials to the unconfigured device, and the unconfigured device may use the network credentials to connect to the wireless network.

After connecting to the wireless network using the newly obtained network credentials, the now configured device terminates execution of the client mode of the configurator service and executes the primary functionality of the device. At some point, the connected device may be instructed by the credential provisioning service to activate the server mode of the configurator service, such that, the connected device may act as a configurator device for unconfigured devices included in the device network. In some examples, the connected device may periodically activate (e.g., after 30 seconds, 5 minutes, 30 minutes, etc.) the server mode of the configurator service to act as a configurator device to allow any unconfigured devices in the device network to obtain network credentials from the configurator device.

In the past, a device with the ability to connect to a wireless network was manually configured to connect to the wireless network. For example, a customer would manually enter network credentials for a wireless network, or manually upload network credentials for the wireless network to the device. The present technology avoids manual configuration of a device and uses a configurator device to provide network credentials to connect to a wireless network. More specifically, the present technology allows a configured device, which is connected to the wireless network, to obtain network credentials and provide the network credentials to an unconfigured device, and this may further allow the unconfigured device to connect to the wireless network. As such, the present technology provides a technological improvement associated with automating wireless network configuration of devices.

To further describe the present technology, examples are now provided with reference to the figures. FIG. 1 is a diagram illustrating a high-level example of a system 100 that may be used to automate configuration of an unconfigured device 106d to connect to a wireless network 104. The system 100 may include a credential provisioning service 102 and devices 106a-n configured to send and/or receive data over a wireless network 104. A device 106a-n may be one of many physical electronic devices that create a large network of addressable devices, commonly referred to as the Internet of Things (IoT). The devices 106a-n may be addressable over a wireless network 104, such as WI-FI, Zigbee, Z-Wave, BLUETOOTH (including BLE (BLUETOOTH Low Energy)), NFC (Near Field Communication), cellular, and the like. The devices 106a-n may host a configurator service 108. Also, a device 106a-n may include a network device, such as a router, access point, gateway, bridge, beacon, or like devices that host the configurator service 108.

The devices 106a-n may be configured to execute primary functionality based on the type of the devices 106a-n. For example, a device 106a-n may be manufactured to perform one or more defined functions, such as: generating data and sending the data over a network to a service provider environment, executing an action in response to a command received over a network, routing network traffic, providing an access point to a network, receiving user interface actions (e.g., receiving button pushes) as well as other functions capable of being performed by a network connected computing device. Some specific examples of devices 106a-n configured to perform primary functionality include, but are not limited to: a product ordering device configured with functionality to order a specific product from a retailer when activated; a network connected thermostat device configured to perform functionality associated with controlling a heating, ventilation, and air conditioning system and sending temperature data to a home monitoring service; a security camera device configured with functionality to capture and send images to a security monitoring service. A device 106a-n can be configured to connect to a wireless network 104, and the device 106a-n can send and/or receive data associated with executing primary functionality as defined by the type of the device 106a-n over the wireless network 104.

In addition to executing primary functionality based on a device type, a device 106a-n may host a configurator service 108 used to obtain network credentials 110 for a wireless network 104. The configurator service 108 may be installed on a device 106a-n at the time that the device 106a-n is manufactured, or sometime thereafter by a distributor, retailer, or customer of the device 106a-n. The configurator service 108 may comprise a server mode 108a and a client mode 108b. The server mode 108a, when executed on a configurator device 106c, may accept connection requests from unconfigured devices 106d (i.e., devices that are not configured to connect to a wireless network 104), authenticate the identity of the unconfigured device 106d, obtain network credentials 110 from a credential provisioning service 102, and send the network credentials 110 to the unconfigured device 106d. The client mode 108b, when executed on an unconfigured device 106d, may detect a predefined default configurator identifier broadcast by a configurator device 106c, authenticate the configurator device 106c, and connect to the configurator device 106c to obtain network credentials 110 for a wireless network 104. A peer-to-peer connection may be established between a configurator device 106c and an unconfigured device 106d using a network protocol, such as, but not limited to, BLE, Zigbee, Z-Wave, WI-FI, and the like. The method executed by the configurator service 108 is described later in greater detail in association with FIGS. 3 and 4.

The client mode 108b of the configurator service 108 may be activated on an unconfigured device 106d to enable the unconfigured device 106d to identify a configurator device 106c and connect to the configurator device 106c in order to obtain network credentials 110 for a wireless network 104 within proximity or wireless communication range of the unconfigured device 106d. Whether a wireless network 104 is in proximity to an unconfigured device 106d may be based on the detectability of a wireless network (e.g., whether the wireless network is broadcasting a SSID) and a network protocol used for the wireless network. As an illustration, a proximity of a WI-FI network to an unconfigured device 106d may be based on a distance of the unconfigured device 106d from a router, switch, access point, or other network device used to implement the WI-FI network. A proximity of an unconfigured device 106d to a cellular network may be based on a distance of the unconfigured device 106d from a cell tower, cell site, cell base station, picocell, or other network equipment used to implement the cellular network.

In one example, after powering on a device 106a-n, the client mode 108b of the configurator service 108 may be activated to determine whether the device 106a-n is configured to connect to a wireless network 104 detected by the device 106a-n. In the case that the device 106a-n is already configured to connect to the wireless network 104, the configurator service 108 may be deactivated. However, in the case that the device 106a-n is unconfigured, the client mode 108b of the configurator service 108 may be used to search for a configurator identifier being broadcast by a configurator device 106c and obtain network credentials 110 for the wireless network 104, as described herein. After connecting to a wireless network 104, a device 106a-n may deactivate the configurator service 108 and perform the primary functionality of the device 106a-n. In the case that a device 106a-n needs to be reconfigured to connect to the wireless network 104, (e.g., the device 106a-n is reset, the network credentials 110 are rotated, etc.) the device 106a-n may activate the client mode 108b of the configurator service 108 to obtain network credentials 110 for the wireless network 104.

The server mode 108a of the configurator service 108 may be activated on a device 106a-n to enable the device 106*a-n* to act as a configurator device 106*c*, allowing unconfigured devices 106*d* to connect to the configurator device 106*c* and obtain network credentials 110 for a wireless network 104. In one example, the server mode 108*a* of the configurator service 108 may be activated after configuring a device 106*a-n* to connect to a wireless network 104, thereby turning the device 106*a-n* into a configurator device 106*c* that provides network credentials 110 to unconfigured devices 106*d*. For example, as described later in association with FIG. 2, an initial device 106*a-n* added to a device network 112 may act as a configurator device 106*c* and additional devices 106*a-n* to be added to the device network 112 may connect to the configurator device 106*c* to obtain network credentials 110 for the wireless network 104 (e.g., added by a user or pre-programmed into the configurator device 106*c*) so that the additional devices 106*a-n* can join the device network 112.

A device network 112 may be a group of devices 106*a-n* configured to connect to a wireless network 104. The devices 106*a-n* in the device network 112 may communicate with one another and/or a device services environment (shown in FIG. 9) via the wireless network 104. In one example, a device 106*a-n* that is already connected to the wireless network 104 may be selected by the credential provisioning service 102 to act as a configurator device 106*c*. The credential provisioning service 102 may send instructions to the selected configurator device 106*c* to activate the server mode 108*a* of the configurator service 108. The configurator device 106*c* may broadcast a configurator identifier to allow unconfigured devices 106*d* to identify and connect to the configurator device 106*c*.

In some examples, a configurator device 106*c* may deactivate the configurator service 108 after determining that a connection request has not been received from an unconfigured device 106*d* for an amount of time (e.g., 30 seconds, 10 minutes, 1 hour, 5 hours, 1 day, etc.). For example, a battery powered device 106*a-n* may deactivate the configurator service 108 after the amount of time to conserve battery power. In some examples, a configurator device 106*c* may periodically (e.g., every 10, 30, or 60 minutes) activate the server mode 108*a* of the configurator service 108 to allow an unconfigured device 106*d* to connect to the configurator device 106*c*, and then deactivate the configurator service 108 after the amount of time, which may be specified using a time parameter for the configurator service 108.

The credential provisioning service 102 may be hosted in a service provider environment (e.g., a "cloud" environment) or within a local network environment (e.g., a LAN (Local Area Network)). The credential provisioning service 102 may be used to manage network credentials 110 for a wireless network 104 and provide the network credentials 110 to unconfigured devices 106*d* via a configurator device 106*c*. An administrator of a wireless network 104 may submit network credentials 110 for the wireless network 104 to the credential provisioning service 102 so that the network credentials 110 may be distributed to devices 106*a-n* included in a device network 112.

As a non-limiting example, a user may create a device network 112 by manually configuring an initial device 106*a-n* to connect to a wireless network 104. After the initial device 106*a-n* has been connected to the wireless network 104, the device 106*a-n* may activate the server mode 108*a* of the configurator service 108 and provide network credentials 110 obtained from the credential provisioning service 102 to unconfigured devices 106*d* within proximity of the device 106*a-n*, and then the unconfigured devices 106*d* can join the device network 112 by connecting to the wireless network 104 using the network credentials 110. Whether a configurator device 106*c* is in proximity to an unconfigured device 106*d* may be based on the specifications of a network protocol used by the devices 106*a-n* to establish peer-to-peer connections. As an illustration, a proximity of a configurator device 106*c* to an unconfigured device 106*d* using the BLE, Zigbee, or Direct WI-FI protocol may be based on the specifications of the BLE, Zigbee, or Direct WI-FI protocol. Accordingly, the technology automates the process of adding devices 106*a-n* to a device network 112 by activating a device 106*a-n* to be a configurator device 106*c* that configures nearby devices 106*a-c* to connect to a wireless network 104 and join the device network 112.

In one example, as explained in more detail later in association with FIG. 4, the credential provisioning service 102 may determine which device 106*a-n* included in a device network 112 will perform the functions of a configurator device 106*c*. For example, the credential provisioning service 102 may select a device 106*a-n* to act as a configurator device 106*c*. Selection of a device 106*a-n* may be based in part on attributes of the device 106*a-n* that allows the device 106*a-n* to act as a configurator device 106*c*. The attributes of the device 106*a-n* that may be considered include, but are not limited to, the available computing resources of the device 106*a-n*, the physical location of the device 106*a-n* in the device network 112, a power source (e.g., battery or outlet power) used to power the device 106*a-n*, as well as other device attributes. The credential provisioning service 102 may maintain a registry of devices 106*a-n* included in a device network 112 and the attributes of the devices 106*a-n*. The credential provisioning service 102 may select a device 106*a-n* from the registry to act as a configurator device 106*c* and send instructions to the device 106*a-n* to activate the server mode 108*a* of the configurator service 108. In response to receiving the instructions, the device 106*a-n* may activate the server mode 108*a* of the configurator service 108, thereby acting as a configurator device 106*c*, and broadcast a configurator identifier that allows unconfigured devices 106*d* to identify the configurator device 106*c*.

Figure 2:
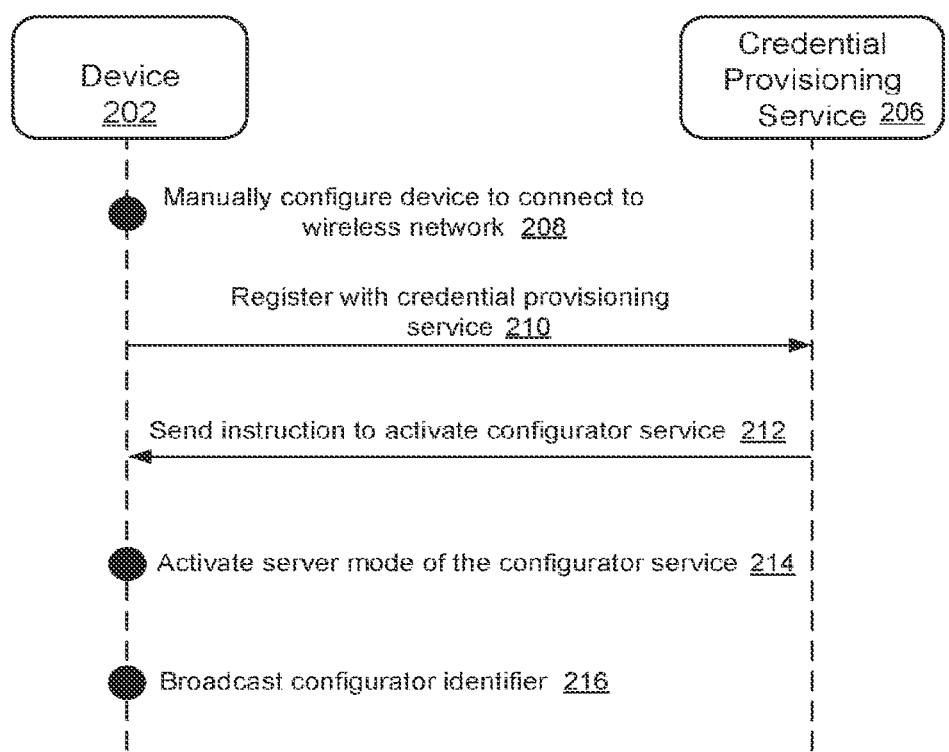
FIG. 2 is a sequence diagram that illustrates an example method for registering a device with a credential provisioning service to enable the device to act as a configurator device for unconfigured devices added to a device network.

FIG. 2 is a sequence diagram that illustrates an example method for registering an initial device 202 with a credential provisioning service 206 to enable the device 202 to act as a configurator device for additional devices that may be added to a device network. As illustrated in operation 208, a device 202 may be manually configured to connect to a wireless network. For example, a user may input network credentials into a user interface included on the device 202, or for devices 202 that do not include a user interface, a user may input network credentials into a user interface on a secondary device (e.g., a mobile device) and the secondary device may transfer the network credentials to the device 202 via a wired connection (e.g., universal serial bus (USB) connection) or a wireless connection (e.g., BLUETOOTH, NFC, RFID or WI-FI Direct). Thereafter, the device 202 may use the network credentials to connect to a wireless network.

As in operation 210, after connecting to the wireless network, the device 202 may be registered with the credential provisioning service 206. In one example, the device 202 may be configured to register itself with the credential provisioning service 206 after connecting to a wireless network. For example, the device 202 may be preconfigured to register with the credential provisioning service 206 by sending a message to the credential provisioning service 206. The message may include information such as a device identifier that may be linked to a user account and/or a device network identifier (e.g., a name assigned to an IoT network) used to identify a device network. The message may include other information as well, such as a wireless network SSID and a geolocation of the device 202. In another example, after connecting the device 202 to a wireless network, a user may register the device 202 with the credential provisioning service 206 via a user interface for the credential provisioning service 206. The credential provisioning service 206 may maintain a device registry (shown in FIG. 4) for devices contained in a device network, enabling the credential provisioning service 206 to identify which devices are included in the device network.

After registering the device 202 with the credential provisioning service 206, the device 202 may receive an instruction from the credential provisioning service 206 to activate a server mode of a configurator service hosted on the device 202, as in operation 212. The server mode of the configurator service, when activated, causes the device 202 to act as a configurator device used to obtain network credentials from the credential provisioning service 206 and provide the network credentials to an unconfigured device requesting the network credentials.

In response to receiving the instruction to activate the server mode of the configurator service, the device 202 may activate the server mode of the configurator service, as in operation 214, and broadcast a configurator identifier, as in operation 216, which may be detectable by unconfigured devices within the proximity of the configurator device 202. For example, the server mode of the configurator service may be configured to broadcast a predefined default SSID (e.g., "Configurator_Device_1234"). The configurator identifier may be broadcast using a network protocol, such as, but not limited to, BLUETOOTH, WI-FI Direct, Zigbee, Z-Wave, and the like. In one example, the configurator identifier may be a service set identifier (SSID) or network name recognized by unconfigured devices as being associated with a configurator device. For example, unconfigured devices may execute a client mode of the configurator service configured to monitor a network frequency band for a predefined default SSID (e.g., "Configurator_Device_1234"), and in response to identifying the predefined default SSID, the unconfigured devices send a connection request to the device 202 to obtain the network credentials for the wireless network, as described below.

Figure 3:
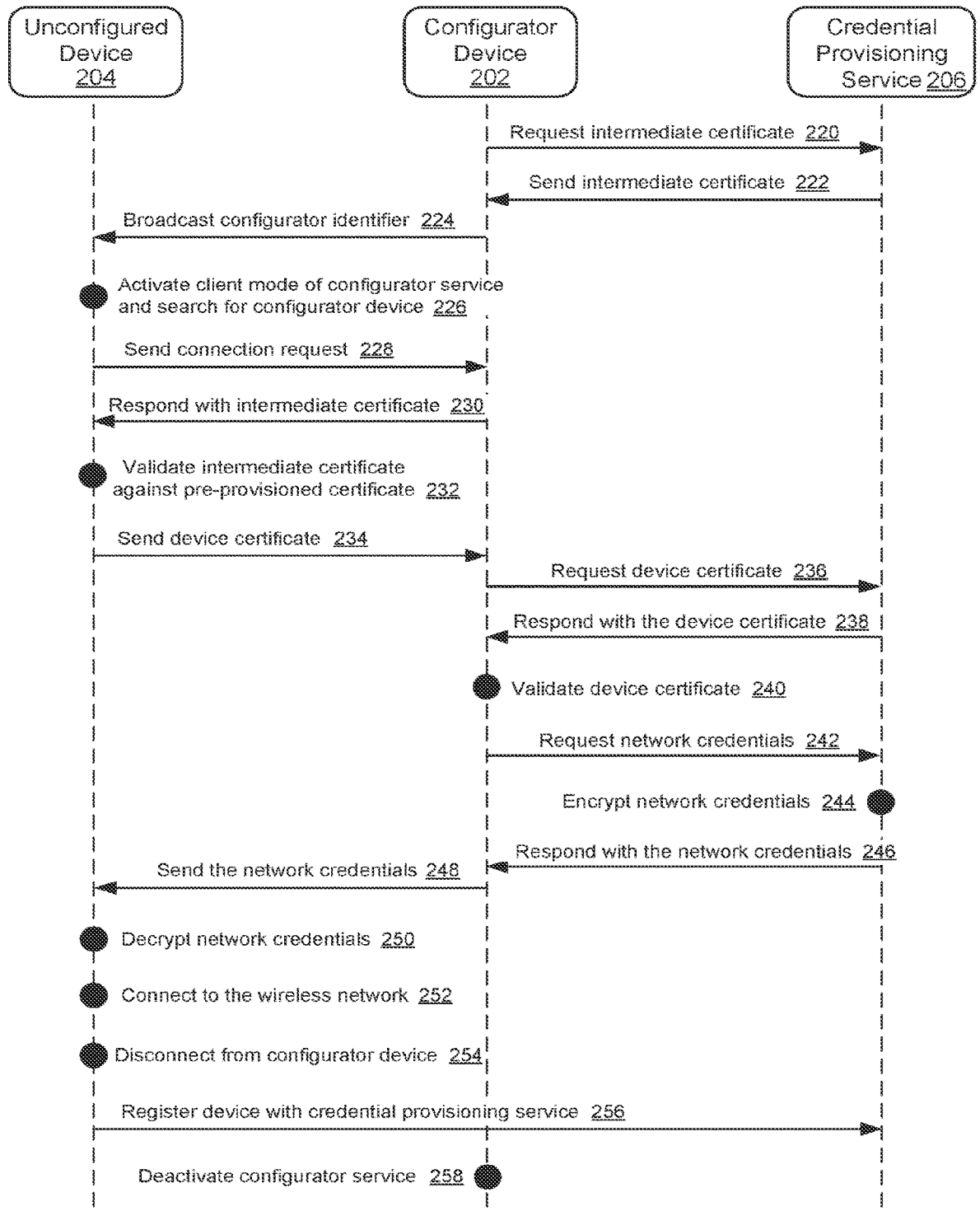
FIG. 3 is a sequence diagram illustrating an example method for connecting to a configurator device to obtain network credentials for a wireless network and configuring an unconfigured device to connect to the wireless network.

FIG. 3 is a sequence diagram illustrating an example method for connecting to a configurator device 202 to obtain network credentials for a wireless network and configuring the unconfigured device 204 to connect to the wireless network. A device, which is executing the server mode of the configurator service (i.e., a configurator device 202), may accept connection requests from unconfigured devices 204 to obtain network credentials for a wireless network that enables the unconfigured devices 204 to connect to the wireless network.

In one example, the configurator device 202 may activate the server mode of the configurator service, and as in operation 220, the configurator device 202 may request an intermediate certificate from the credential provisioning service 206. In one example, the request for the intermediate certificate may include a device certificate for the configurator device 202 which the credential provisioning service 206 uses to validate the identity of the configurator device 202. The intermediate certificate may be a subordinate certificate issued by a trusted root certificate authority for the purpose of issuing end-entity server certificates. The intermediate certificate may be used by an unconfigured device 204 confirm the identity of a configurator device 202. As in operation 222, in response to the request for the intermediate certificate, the credential provisioning service 206 may send the intermediate certificate to the configurator device 202.

As in operation 224, the configurator device 202 may broadcast a configurator identifier which may be detectable by unconfigured devices 204 within the proximity of the configurator device 202. An unconfigured device 204 may be a device that has not yet been configured to connect to a wireless network or a device with network credentials that are no longer valid.

An unconfigured device 204 may, as part of a determination that the unconfigured device 204 is not connected to a wireless network, activate the client mode of the configurator service and search for a configurator device 202, as in operation 226. For example, after being powered on for a first time or after being denied access to a wireless network, the unconfigured device 204 may activate the client mode of the configurator service and monitor a network frequency band using a transceiver to detect a configurator identifier broadcast by a configurator device. After detecting the configurator identifier, the unconfigured device 204 may send a connection request to the configurator device 202, as in operation 228.

In one example, more than one configurator device 202 may be within a detectable range of an unconfigured device 204. In such a case, the unconfigured device 204 may determine which of the configurator devices 202 provide a stronger wireless network signal and connect to the configurator device 202 that provides the stronger wireless signal. In another example involving multiple configurator devices 202 that are within a detectable range of an unconfigured device 204, the unconfigured device 204 may select a configurator device 202 based on a number of connection requests being processed by the configurator device 202. For example, an unconfigured device 204 may select a configurator device 202 that is processing fewer connection requests as compared to other configurator devices 202 within proximity of the unconfigured device 204. In yet another example, a sequence or series of configurator identifiers may be generated and broadcast by a group of configurator devices to assist with distributing and load balancing the connections to the configurators, where each configurator device 202 broadcasts a configurator identifier included in the sequence or series. As a non-limiting example, a first configurator device may broadcast the SSID "Configurator_Device_1", a second configurator device may broadcast the SSID "Configurator_Device_2", and a third configurator device may broadcast the SSID "Configurator_Device_3". Illustratively, an unconfigured device 204 may attempt to connect to a configurator device broadcasting an SSID with a higher value and a lower position in a configurator tree (or vice-versa) included in the series of SSIDs, and if the connection is unsuccessful, the unconfigured device 204 may progress up or down through the series of SSIDs until a successful connection is made with a configurator device 202. For example, an unconfigured device 204 may select a first or last SSID in the series and progress up or down from the SSID until a successful connection to a configurator device 202 is established. This way the unconfigured devices 204 may start at leaf nodes of an SSID numbering tree so that the configuration of the unconfigured devices 204 is not clustered to just a few configurator devices 202 in a growing group of configurators. Also, in some examples, in the case that a connection to a configurator device 202 cannot be established, or a connection to a configurator device 202 fails, an unconfigured device 204 may be programmed to connect to a "fallback" configurator device, which may be another configurator device 202 within a wireless communication range of the unconfigured device 204.

As in operation 230, the configurator device 202 may respond to the connection request by sending the intermediate certificate to the unconfigured device 204, and as in operation 232, the unconfigured device 204 may validate the intermediate certificate against a pre-provisioned certificate stored on the unconfigured device 204 to confirm the authenticity of the intermediate certificate and the identity of the configurator device 202. For example, at the time of manufacture of a device, a certificate may be stored to a memory component (e.g., a flash memory) included in the device, and the device may use the certificate to validate the authenticity of an intermediate certificate provided by a configurator device 202.

After validating the identity of the configurator device 202, as in operation 234, the unconfigured device 204 may send a device certificate to the configurator device 202. The configurator device 202 may use the device certificate to validate the identity of the unconfigured device 204 and confirm that the unconfigured device 204 is authorized to connect to the wireless network. In response to receiving the device certificate from the unconfigured device 204, as in operation 236, the configurator device 202 may request a copy of the device certificate from the credential provisioning service 206. As in operation 238 the credential provisioning service 206 may respond by sending the device certificate to the configurator device 202, and as in operation 240, the configurator device 202 may validate the device certificate provided by the unconfigured device 204 using the copy of the device certificate received from the credential provisioning service 206 to confirm the authenticity of the device certificate provided by the unconfigured device 204, thereby confirming the identity of the unconfigured device 204 and that the unconfigured device 204 is authorized to connect to the wireless network.

Having successfully validated the identity of the unconfigured device 204 and determining that the unconfigured device 204 is authorized to connect to the wireless network, then as in operation 242, the configurator device 202 may send a request for the network credentials to the credential provisioning service 206. As in operation 244, the credential provisioning service 206 may encrypt the network credentials, and as in operation 246, the credential provisioning service 206 may respond to the request by sending the network credentials to the configurator device 202.

In another alternative configuration, the configurator device 202, in response to receiving a device certificate from the unconfigured device 204, may send the device certificate to the credential provisioning service 206 with a request for the network credentials. The credential provisioning service 206 may validate the device certificate to confirm the identity of the unconfigured device 204 and send the network credentials to the configurator device 202.

As in operation 248, the configurator device 202 may send the network credentials to the unconfigured device 204, and as in operation 250, the unconfigured device 204 may decrypt the network credentials using an encryption key stored on the unconfigured device 204. For example, prior to delivering an unconfigured device 204 to a customer, a private encryption key of a private/public encryption key pair may be pre-provisioned to the unconfigured device 204 and the private encryption key may be stored in the memory of the unconfigured device 204. When adding the unconfigured device 204 to a device network, the credential provisioning service 206 may use the public encryption key to encrypt network credentials for a wireless network and send the encrypted network credentials to the unconfigured device 204. Then the unconfigured device 204 may retrieve the private encryption key from memory and decrypt the network credentials using the private encryption key.

As in operation 252, the unconfigured device 204 may use the network credentials to connect to the wireless network. In one example, the unconfigured device 204 may verify that the network credentials are valid by sending the network credentials to the wireless network (e.g., a WI-FI network) with a request to connect to the wireless network. After verifying the network credentials, the network credentials may be stored in memory on the unconfigured device 204. Having successfully connected to the wireless network, the unconfigured device 204 is now a configured device which connects to the wireless network. As in operation 254, the now configured device disconnects from the configurator device 202 and deactivates the client mode of the configurator service.

In one example, after connecting to the wireless network, the configured device may register with the credential provisioning service 256, which maintains a record of registered devices that are included in the device network, allowing the credential provisioning service 256 to keep track of devices included in the device network, and select one or more devices to act as configurator devices 202. As in operation 258, the configurator device 202 may deactivate the server mode of the configurator service. For example, the configurator device 202 may monitor connection requests and if a connection request has not been received for an amount of time, the configurator device 202 may deactivate the server mode of the configurator service. In one example, the configurator device 202 may deactivate the server mode of the configurator service for a period of time (e.g., 30 seconds, 1 minute, 5 minutes, etc.) and then reactivate the server mode of the configurator service. In another example, the configurator device 202 may deactivate the server mode of the configurator service until the configurator device 202 receives instructions to reactivate the server mode of the configurator service.

While the operations illustrated in FIGS. 2-3 may imply a specific order of execution, the order of execution may differ from what is illustrated and described above. For example, the order of two more operations may be rearranged as compared to the order shown in FIGS. 2-3 and described above. Furthermore, two or more operations shown in succession may be executed in parallel or with partial parallelization. In some configurations, one or more operations may be omitted or skipped completely.

Figure 4:
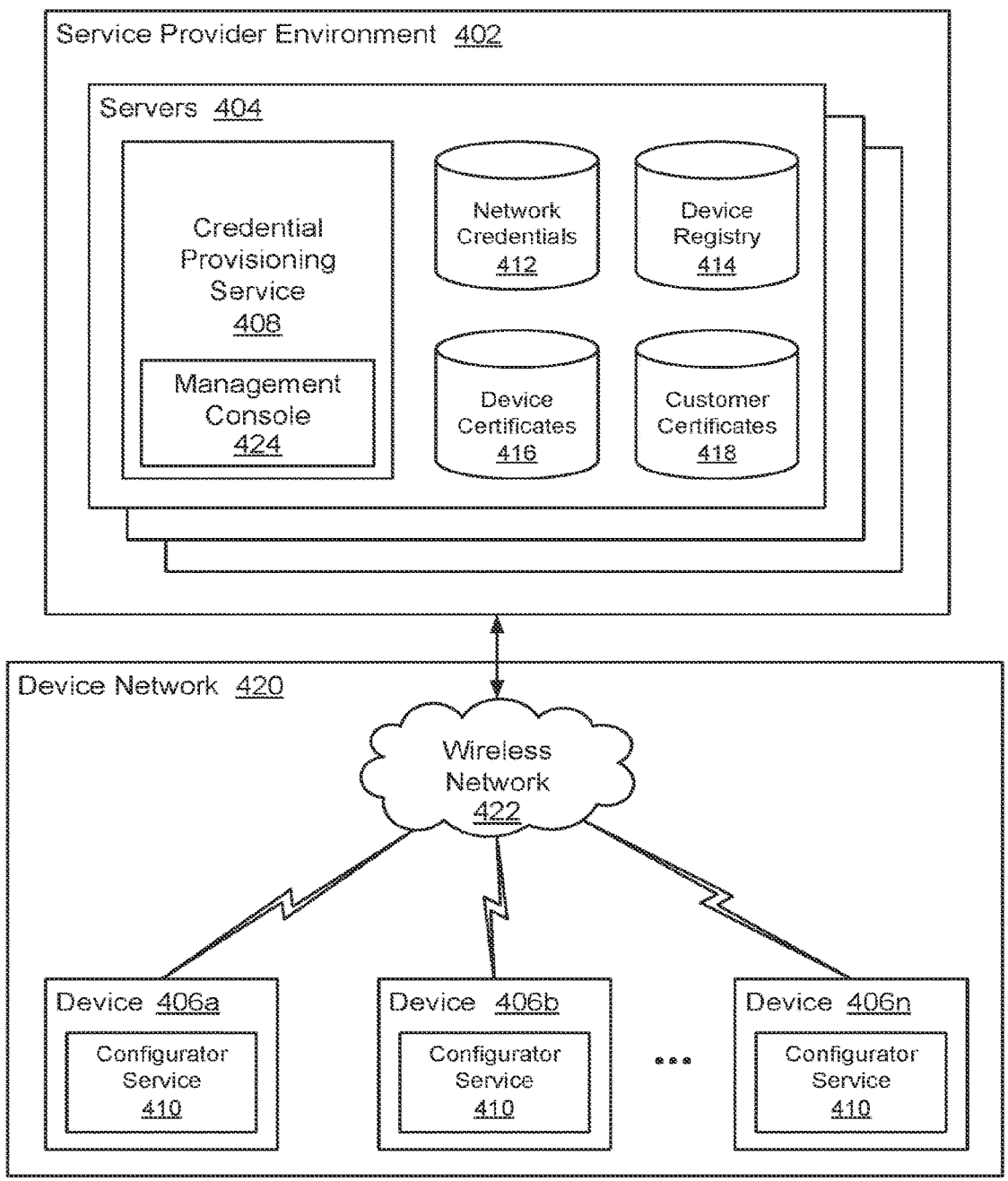
FIG. 4 is a block diagram that illustrates various example components included in a system for connecting an unconfigured device to a wireless network using network credentials obtained via a configurator device.

FIG. 4 illustrates components of an example system environment 400 within which the present technology may be executed. The system environment 400 may include a service provider environment 402 containing one or more servers 404 used to host a credential provisioning service 408 which may be in network communication with a device network 420 containing a plurality of devices 406a-n. As described in more detail in relation to FIG. 7, the service provider environment may be a "cloud" environment that has computing resources which may include servers 404, computing instances (e.g., virtual machines), virtualized services, and other types of computing resources available to customers of a computing service provider.

In one example, the credential provisioning service 408 may be configured to manage network credentials 412 for wireless networks 422 used within various device networks 420 and configured to distribute the network credentials 412 to devices 406a-n included in a device network 420. In one example, the credential provisioning service 408 may be a managed service provided by a service provider (e.g., a "cloud" provider). The service provider may offer the credential provisioning service 408 to a customer for use with the customer's device network 420 of devices 406a-n.

Figure 5:
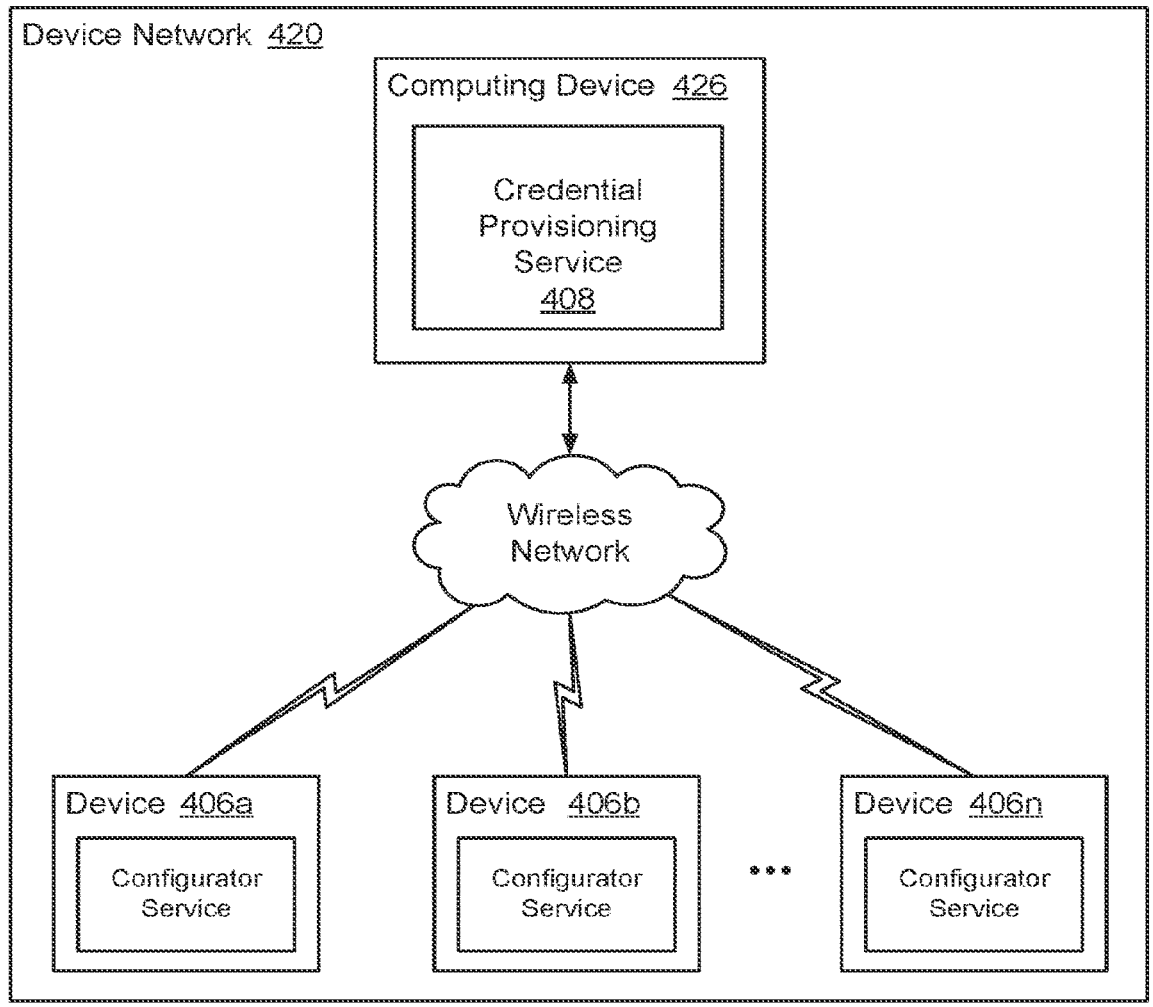
FIG. 5 is a block diagram that illustrates an example system that includes a credential provisioning service hosted within a device network.

In an alternative example, as illustrated in FIG. 5, the credential provisioning service 408 may be hosted within a device network 420. For example, a local device network may include a computing device 426 or services hub that hosts the credential provisioning service 408, and a wireless network administrator may manage network credentials for a wireless network via the credential provisioning service 408. As an example, a device network 420 located in a manufacturing facility may include a local computing device 426 (e.g., server) that hosts the credential provisioning service 408, and devices 406a-n included in the device network 420 may obtain network credentials for a wireless network from the credential provisioning service 408 hosted on the local computing device 426. A services hub may be a computing device configured to provide services to devices 406a-n included in a device network 420 and to communicate with computing systems included in a service provider environment 402. For example, the services hub may provide services that include, but are not limited to: a message service, a program code function service, a device shadowing service, and user developed services.

Returning to FIG. 4, the credential provisioning service 408 may include a management console 424 (e.g., a user interface) which may be used by a customer to upload network credentials 412 for the customer's wireless network 422 to the service provider environment 402. For example, a customer, via the management console 424, may submit network credentials 412 to the credential provisioning service 408, and the network credentials 412 may be stored within the service provider environment 402. In one example, network credentials 412 uploaded by a customer may be encrypted using the customer's encryption key and the encrypted network credentials 412 may be stored within the service provider environment 402. The customer's devices 406a-n may receive the encrypted network credentials 412, via the credential provisioning service 408, and decrypt the network credentials 412 using a copy of the encryption key stored on the devices 406a-n.

In some examples, a customer may use the management console 424 to submit a device certificate 416 associated with the customer's devices 406a-n to the credential provisioning service 408. A device certificate 416 may be a digital certificate or identity certificate (e.g., a PKI (Public Key Infrastructure) certificate) used to prove ownership of a public key. The device certificate 416 may include information about the key, information about the identity of a device 406a-n, and/or a digital signature associated with an entity that has verified the device certificate's contents. The device certificates 416 may be used by the credential provisioning service 408 or by a device 406a-n executing the server mode of the configurator service 410 to authenticate the identity of the customer's devices 406a-n.

In one example, the management console 424 may be used by a customer to monitor devices 406a-n included in the customer's device network 420. For example, a customer may view information for the customer's device network 420 that includes, but is not limited to, information about devices 406a-n included in the device network 420 and various attributes of the devices 406a-n. In one example, the management console 424 may access a device registry 414 to obtain information for devices 406a-n registered with the credential provisioning service 408. A customer may use the management console 424 to view the information, which may include, a device identifier, a network connection status, a configurator service status (active, inactive), hardware attributes, and other information for a device 406a-b contained in the device registry 414. Device information contained in the device registry 414 may be provided by a customer via the management console 424 or may be obtained from a device 406a-n as part of registering or syncing the device 406a-n with the credential provisioning service 408.

As described earlier, the credential provisioning service 408 may be configured to select a device 406a-n registered with the credential provisioning service 408 to act as a configurator device and provide network credentials 412 to unconfigured devices. A device 406a-n selected by the credential provisioning service 408 may be selected based in part on attributes of the device 406a-n that allow the device 406a-n to act as a configurator device. The attributes may include hardware attributes, software attributes, location attributes, as well as other device attributes. For example, the credential provisioning service 408 may analyze device attributes obtained from a device registry 414 to determine whether a device 406a-n has a configurator service 410 installed that allows the device 406a-n to act as a configurator device, whether the device 406a-n has sufficient computing resources (e.g., processor and memory) to execute a server mode of the configurator service 410, whether the device 406a-n has a power source (e.g., outlet power or battery power) that is sufficient to support execution of the server mode of the configurator service 410, etc. In one example, the credential provisioning service 408 may mark a registered device (e.g., a device 406a-n registered with the credential provisioning service 408) in the device registry 414 as eligible to execute the server mode of the configurator service 410.

After selecting a device 406a-n to act as a configurator device, the credential provisioning service 408 may send instructions to the device 406a-n to activate the server mode of the configurator service 410. Along with instructing the device 406a-n to activate the server mode of the configurator service 410, the credential provisioning service 408 may obtain (e.g., locally generate) an intermediate certificate, which may be created using a customer certificate 418, and send the intermediate certificate to the device 406a-n. The device 406a-n, acting as a configurator device, may provide the intermediate certificate to an unconfigured device, and the unconfigured device may validate the identity of the configurator device using the intermediate certificate. For example, the unconfigured device may validate the intermediate certificate against a pre-provisioned certificate stored on the unconfigured device.

As illustrated, a device 406a-n may host the configurator service 410. The configurator service 410 may be installed on a device 406a-n prior to deploying the device 406a-n to a device network 420. For example, the configurator service 410 may be installed on a device 406a-n by a manufacturer, distributor, retailer, or by a customer. The configurator service 410 may include a server mode and a client mode. The server mode of the configurator service 410 may be executed by a configurator device 406a-n to provide network credentials 412 to unconfigured devices, and the client mode of the configurator service 410 may be executed by unconfigured devices to connect to a configurator device and obtain the network credentials 412.

In one example, the server mode of the configurator service 410 may be activated by a device 406a-n after the device 406a-n is manually configured to connect to a wireless network 422 in order to provide network credentials 412 obtained from the credential provisioning service 408 to unconfigured devices, and/or after receiving instructions from the credential provisioning service 408 to activate the server mode of the configurator service 410. Illustratively, executing the server mode on a device 406a-n may cause the device 406a-n to receive a connection request from an unconfigured device to obtain network credentials 412 that enable the unconfigured device to connect to a wireless network 422. In response, the device 406a-n may send configurator authentication information (e.g., an intermediate certificate) to the unconfigured device to enable the unconfigured device to authenticate the device 406a-n as a configurator device. The device 406a-n may then: authenticate the unconfigured device using device authentication information (e.g., a device certificate 416) received from the unconfigured device, obtain the network credentials 412 from the credential provisioning service 408, and send the network credentials 412 to the unconfigured device to enable the unconfigured device to connect to the wireless network 422.

The client mode of the configurator service 410 may be activated by a device 406a-n in response to a determination that the device 406a-n is not connected to a wireless network 422. For example, the client mode may be activated after powering on a device 406a-n for a first time or after a device 406a-n is denied access to a wireless network due to invalid network credentials. Illustratively, executing the client mode of the configurator service 410 on a device 406a-n may cause the device 406a-n to detect a configurator device executing the server mode of the configurator service 410 in conjunction with executing primary functionality of the configurator device. The device 406a-n may send a connection request to the configurator device (e.g., another device 406a-n) to obtain the network credentials 412 that enable the device 406a-n to connect to the wireless network 422. The device 406a-n may receive configurator authentication information (e.g., an intermediate certificate) from the configurator device and authenticate the configurator device as a configurator using the configurator authentication information. The device 406a-n may receive the network credentials 412 obtained from the credential provisioning service 408 and connect to the wireless network 422 using the network credentials 412.

The various processes and/or other functionality contained within the service provider environment 402 may be executed on one or more processors that are in communication with one or more memory modules. The service provider environment 402 may include a number of computing devices that are arranged, for example, in one or more server banks or computer banks or other arrangements. The computing devices may support a computing environment using hypervisors, virtual machine monitors (VMMs), and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls, or other network commands made in relation to the credential provisioning service 408 in the service provider environment 402 and the devices 406a-n in the device network 420 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

Communication networks included in the system environment 400 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof. While FIG. 4 illustrates an example of a system environment that may implement the techniques above, many other similar or different environments are possible. The example environments discussed and illustrated above are merely representative and not limiting.

Figure 6:
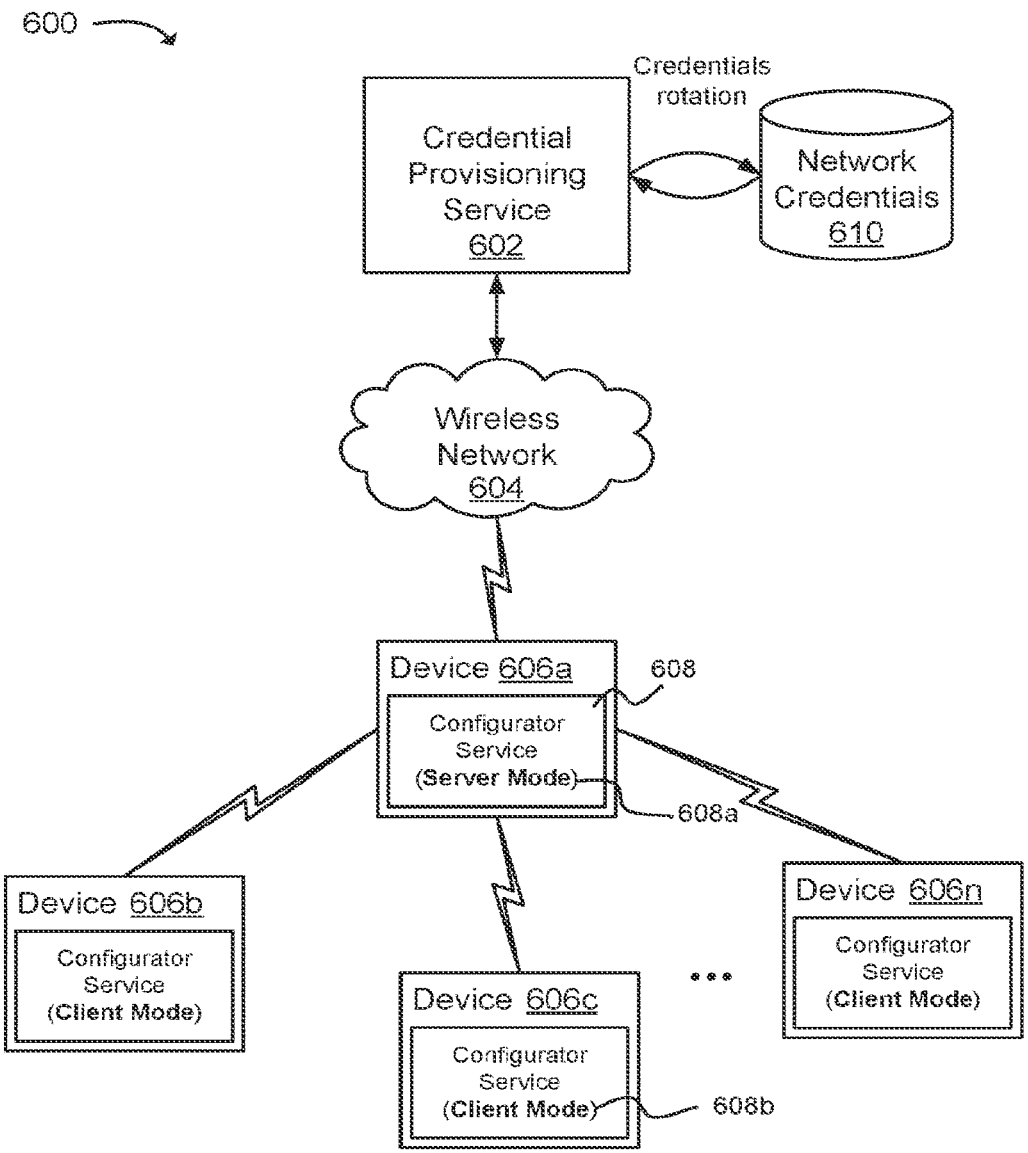
FIG. 6 is a diagram illustrating an example system for distributing network credentials to devices in association with rotating network credentials for a wireless network.

FIG. 6 is a diagram illustrating an example system 600 for distributing network credentials 610 to devices 606a-n in association with rotating network credentials 610 for a wireless network 604. Network credentials rotation may be used to improve network security for a device network. However, implementing a rotation policy in some device networks may be difficult due to a number of devices 606a-n that may be included in some device networks. The present technology allows for automation of configuring devices to connect to a wireless network 604. The technology may be used to implement a credentials rotation policy for a device network using a credential provisioning service 602 to distribute network credentials 610 to devices 606a-n via a device 606a that executes a server mode 608a of a configurator service 608.

In one example, as part of a credentials rotation policy, the credential provisioning service 602, prior to rotating network credentials 610 for a wireless network 604, may send new network credentials to a device 606a with instructions to update the network credentials on the device 606a and activate the server mode 608a of the configurator service 608, causing the device 606a to broadcast a configurator identifier. Thereafter, the network credentials 610 for the wireless network 604 may be changed to the new network credentials.

After changing the network credentials for the wireless network 604, those devices 606b-n configured with the old network credentials may be denied access to the wireless network 604. In response to being denied access to the wireless network 604, the devices 606b-n may activate the client mode 608b of the configurator service 608 and search for a configurator device 606a executing the server mode 608a of the configurator service 608 which is broadcasting a configurator identifier in order to obtain valid network credentials. The devices 606b-n may detect the configurator identifier and send connections requests to the device 606a executing the server mode 608a of the configurator service 608 to obtain the new network credentials from the device 606a. As described earlier, the devices 606a and 606b-n may perform authentication, and the device 606a may provide the new network credentials to the devices 606b-n. In one example, the device 606a may provide the new network credentials stored on the device 606a. In another example, in response to each request received from the devices 606*b-n*, the device 606*a* may obtain the new network credentials from the credential provisioning service 602 and provide the new network credentials to the other devices 606*b-n*.

In one example, after a device 606*b-n* has been configured to use the new network credentials, the device 606*b-n* may deactivate the client mode of the configurator service 608 and activate the server mode 608*a* of the configurator service 608 in order to provide the new network credentials to other devices that may be within wireless communication range of the 606*b-n*, thereby increasing the distribution speed of the new network credentials to unconfigured devices included in the device network. The description above describes one example of distributing network credentials 610 to devices 606*a-n* as part of a network credential rotation policy. As will be appreciated, other methods of using the technology to implement a network credential rotation policy are within the scope of this disclosure.

Figure 7:
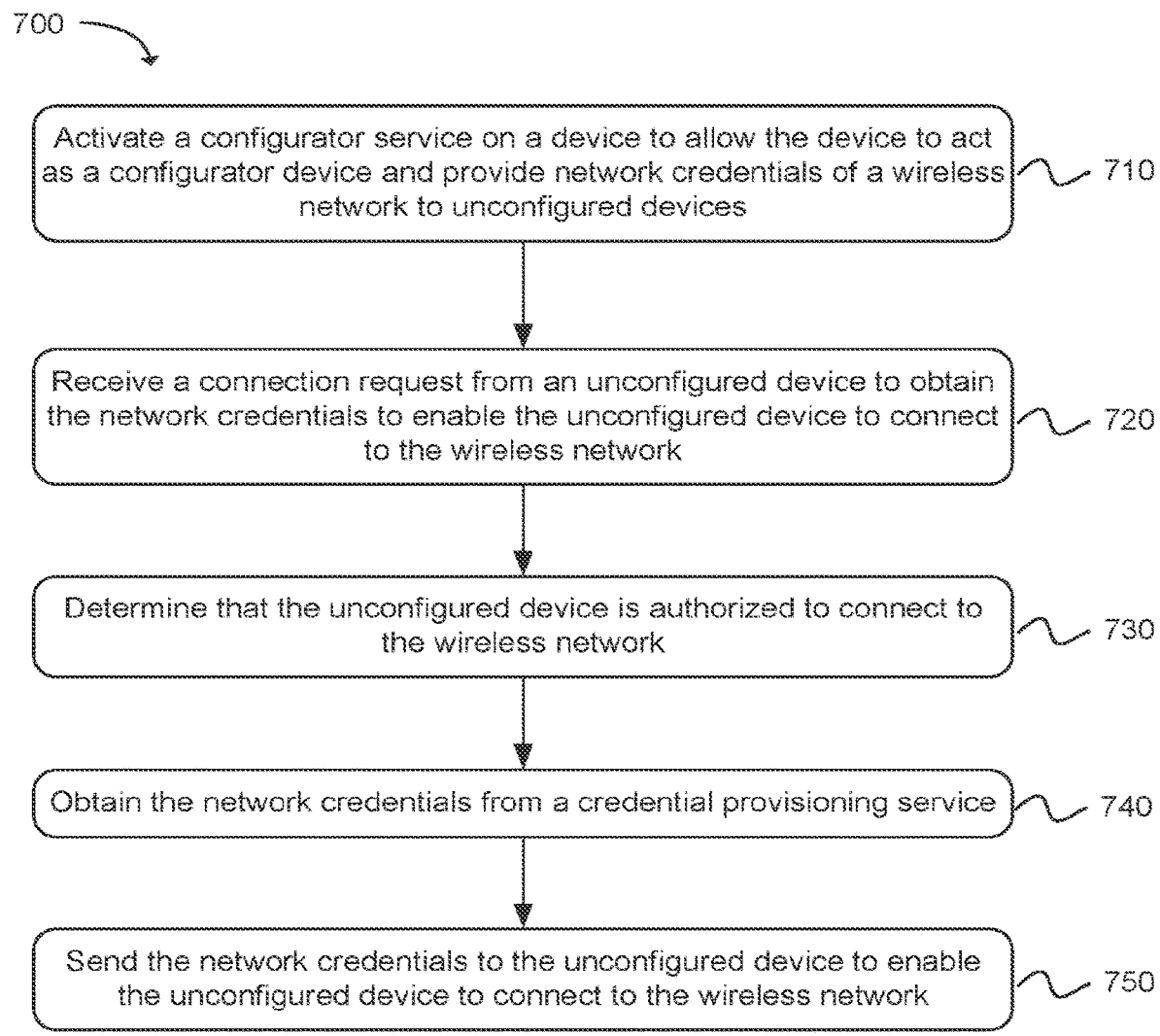
FIG. 7 is a flow diagram that illustrates an example method for connecting an unconfigured device to a wireless network using network credentials obtained via a configurator device.

FIG. 7 is a flow diagram illustrating an example method 700 for connecting an unconfigured device to a wireless network using network credentials obtained via a configurator device. As in block 710, a configurator service may be activated on a device to allow the device to act as a configurator device and provide network credentials of a wireless network to unconfigured devices. In one example, the device may receive instructions from a credential provisioning service to activate the configurator service, and the device may execute the configurator service in conjunction with executing primary functionality of the device. In one example, the device may be selected by the credential provisioning service to execute the configurator service based in part on attributes of the device that allow the device to act as the configurator device.

Activating the configurator service may cause the device to broadcast a configurator identifier which is detectable by unconfigured devices within wireless communication range of the device, wherein the unconfigured devices may be configured to search for the configurator identifier and connect to the device. After activating the configurator service on the device, the device may act as a configurator device, and as in block 720, a connection request may be received from an unconfigured device to obtain the network credentials to enable the unconfigured device to connect to the wireless network. In response to receiving the connection request, in one example, the configurator device may send configurator authentication information to the unconfigured device to enable the unconfigured device to authenticate the device as a configurator device. The configurator authentication information may include a digital certificate, security token, or another type of authentication information.

As in block 730, the device (i.e., the configurator device) may determine whether the unconfigured device is authorized to connect to the wireless network. For example, the unconfigured device may send device authentication information (e.g., a digital certificate, security token, or another type of authentication information) to the configurator device. In one example, in response to receiving the device authentication information, the configurator device may send the device authentication information to the credential provisioning service for validation of the authentication information. In another example, the configurator device may authenticate the device authentication information using authentication information obtained from the credential provisioning service. For example, the configurator device may request a copy of a device certificate from the credential provisioning service for the unconfigured device, and authenticate the unconfigured device using a device certificate provided by the unconfigured device and the copy of the device certificate obtained from the credential provisioning service.

As in block 740, the network credentials may be obtained from the credential provisioning service, and as in block 750, the network credentials may be sent to the unconfigured device to enable the unconfigured device to connect to the wireless network. In one example, sending the network credentials to the unconfigured device may include encrypting the network credentials using a device certificate associated with the unconfigured device. After receiving the encrypted network credentials, the unconfigured device may decrypt the network credentials using a copy of the device certificate or another encryption key that is stored on the unconfigured device. In one example, the device acting as the configurator device may determine that a connection request has not been received for an amount of time (e.g., 10 minutes, 1 hour, 5 hours, 1 day, etc.) and deactivate the configurator service on the device.

Figure 8:
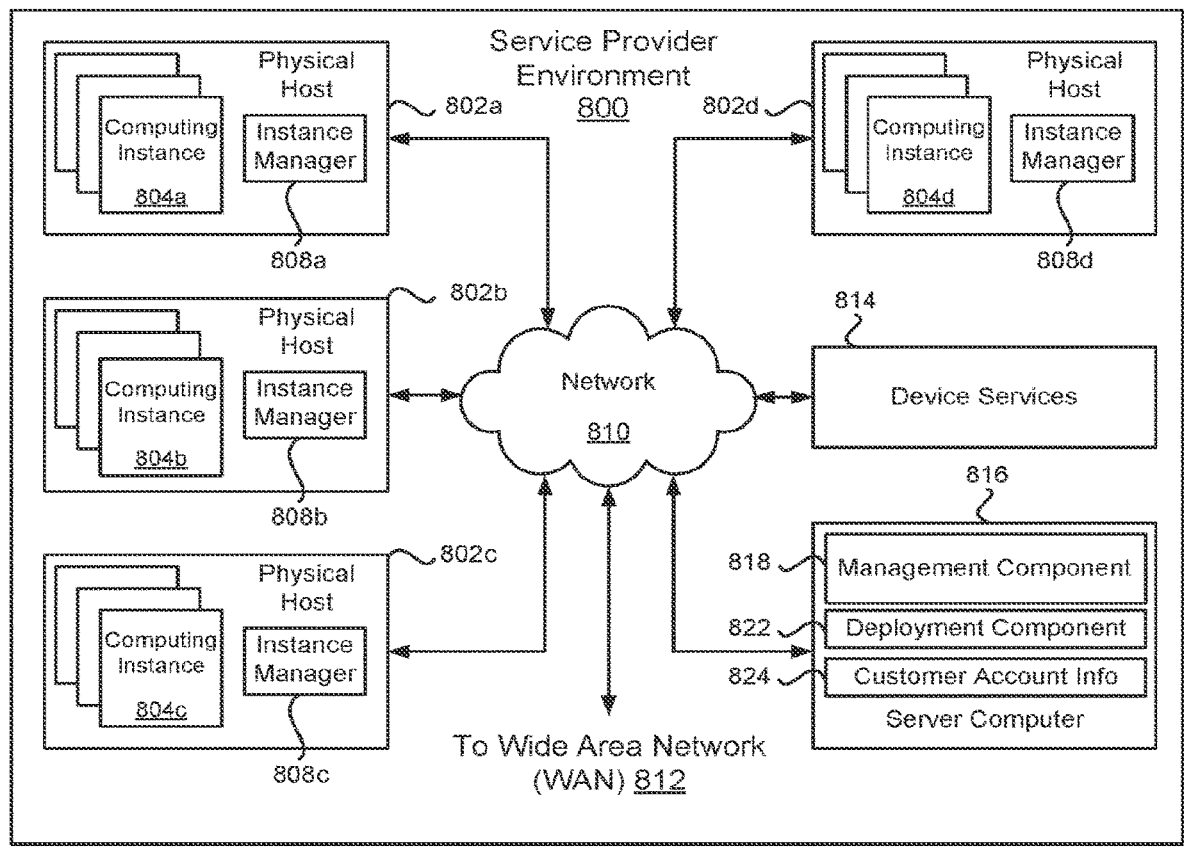
FIG. 8 is a block diagram that illustrates an example service provider environment which may host device services.

FIG. 8 is a block diagram illustrating an example of a service provider environment 800 that may be used to host the credential provisioning service described earlier. Also, the service provider environment 800 may be used to implement a device services environment described in association with FIG. 9, which may be used to provide the credential provisioning service and various other services to devices within a device network. The service provider environment 800 may include computing resources that may include physical hosts 802*a-d*, computing instances 804*a-d*, virtualized services, and other types of computing resources which may be available to customers of a computing service provider. The computing resources may have many different configurations of processor capabilities, main memory, disk storage, and operating system. In particular, the service provider environment 800 depicted illustrates one environment in which the technology described herein may be used.

The service provider environment 800 may be one type of environment that includes various virtualized service resources that may be used, for instance, to host computing instances 804*a-d* which may be an instance of a software implementation of a machine (i.e. a computer) configured to emulate a physical machine. For example, the service provider environment 800 may offer virtual or hardware devices, database resources and instances, file or block data storage resources, and/or networking resources, such as load balancing resources, domain name service ("DNS") resources, virtual private cloud ("VPC") resources, virtual local area network ("VLAN") resources, and/or other types of hardware and software computing resources or managed services on a permanent or as-needed basis. A managed service may include computing related services offered by a computing service provider, such as data store services, computing services, network services, IoT device services, and the like. The computing resources can also include, but are not limited to, computing instances 804*a-d* and images, security groups, option groups, gateways, option sets, network access control lists ("ACLs"), subnets, storage buckets, network interfaces, snapshots, spot market requests, and storage volumes.

The computing resources described above may be provided in one particular implementation by one or more data centers operated by the computing service provider. As known to those skilled in the art, data centers are facilities utilized to house and operate computer systems and associated components. Data centers also typically include redundant and backup power, communications, cooling, and security systems. The data centers can be located in geographically disparate regions, and can also be connected to various other facilities, such as co-location facilities, and various wide area networks 812 ("WANs"), such as the Internet.

The service provider environment 800 may be capable of delivery of computing, storage and networking capacity as a software service to a community of end recipients. In one example, the service provider environment 800 may be established for an organization by or on behalf of the organization. That is, the service provider environment 800 may offer a "private cloud environment." In another example, the service provider environment 800 may support a multi-tenant environment, wherein a plurality of customers may operate independently (i.e., a public cloud environment). Generally speaking, the service provider environment 800 may provide the following models: Infrastructure as a Service ("IaaS"), Platform as a Service ("PaaS"), and/or Software as a Service ("SaaS"). Other models may be provided. For the IaaS model, the service provider environment 800 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 800. End customers may access the service provider environment 800 using networked client devices, such as desktop computers, laptops, tablets, smartphones, etc. running web browsers or other lightweight client applications, for example. Those familiar with the art will recognize that the service provider environment 800 may be described as a "cloud" environment.

The particularly illustrated service provider environment 800 may include a plurality of server computers 802a-d. While four server computers are shown, any number may be used, and large data centers may include thousands of server computers. The service provider environment 800 may provide computing resources for executing computing instances 804a-d and managed services. Computing instances 804a-d may, for example, be virtual machines. A virtual machine may be an instance of a software implementation of a machine (i.e. a computer) that executes applications like a physical machine. In the example of a virtual machine, each of the server computers 802a-d may be configured to execute an instance manager 808a-d capable of executing the instances. The instance manager 808a-d may be a hypervisor, virtual machine monitor (VMM), or another type of program configured to enable the execution of multiple computing instances 804a-d on a single server. Additionally, each of the computing instances 804a-d may be configured to execute one or more applications.

One or more server computers 816 may be reserved to execute software components for managing the operation of the service provider environment 800 and the computing instances 804a-d. For example, a server computer 816 may execute a management component 818. A customer may access the management component 818 to configure various aspects of managed services used by a customer. A deployment component 822 may be used to assist customers in the deployment of managed services and computing resources. Customer account information 824 may include any desired information associated with a customer. One or more server computers 814 may be used to execute device services, such as the credential provisioning service described earlier.

A network 810 may be utilized to interconnect the service provider environment 800 and the server computers 802a-d, 816. The network 810 may be a local area network (LAN) and may be connected to a Wide Area Network (WAN) 812 or the Internet, so that end customers may access the service provider environment 800. The network topology illustrated in FIG. 8 has been simplified, many more networks and networking devices may be utilized to interconnect the various computing systems disclosed herein.

Figure 9:
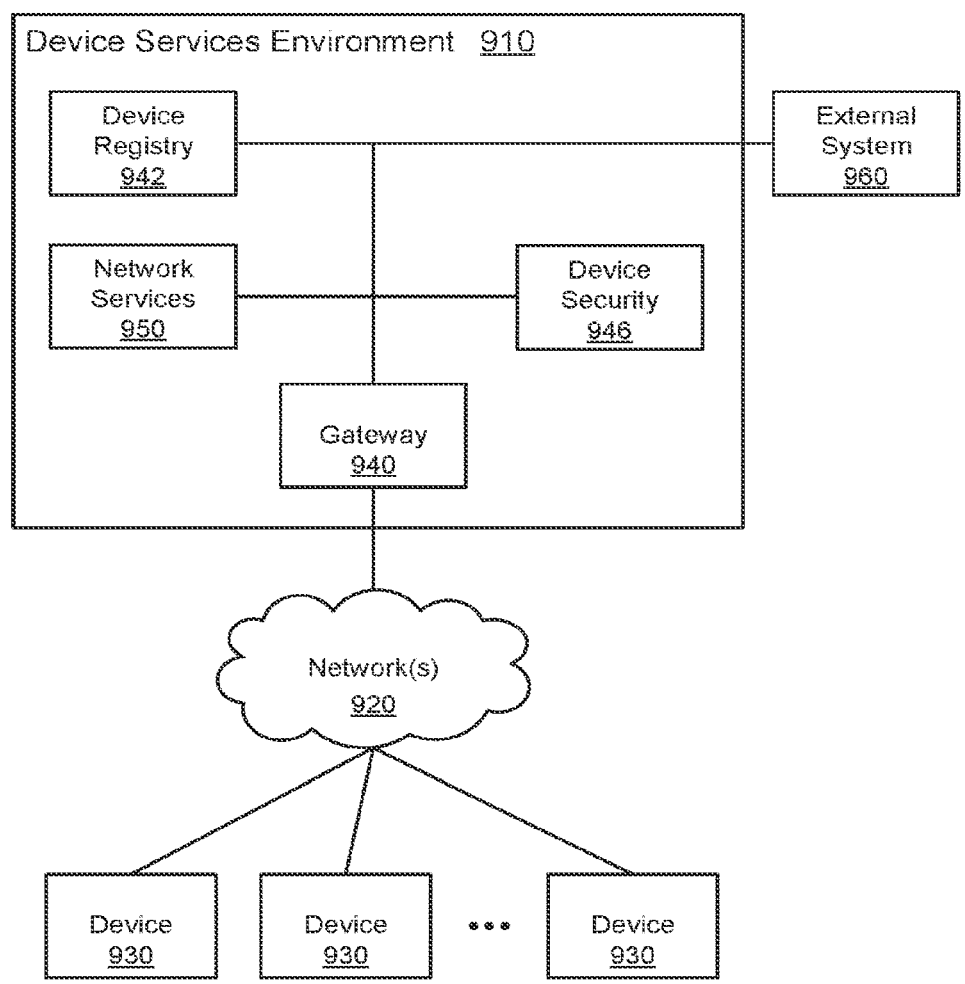
FIG. 9 is a block diagram illustrating an example computer networking architecture for a device services environment.

FIG. 9 is a block diagram illustrating an example device services environment 910 with which devices 930 configured to host the configurator service described herein may communicate. In particular, the device services environment 910 may include the credential provisioning service described earlier. In one example, a device 930 may communicate with the device services environment 910 to access services, including the credential provisioning service and other services, such as, data storage and retrieval services, on-demand processing capacity, publication services, or device representation services. The device services environment 910 may comprise various resources made accessible via a gateway server 940 to the devices 930 that access the gateway server 940 via a network 920, such as a local wireless network that provides access to a wide area network. The devices 930 may access the device services environment 910 in order to access network and device services. Services operating in the device services environment 910 may communicate data and publication messages to the devices 930 in response to requests from the devices 930 and/or in response to computing operations within the services.

The device services environment 910 may comprise communicatively coupled component systems 940, 942, 946, and 950 that operate to provide services to the devices 930. The gateway server 940 may be configured to provide an interface between the devices 930 and the device services environment 910. The gateway server 940 receives requests from the devices 930 and forwards corresponding data and publication messages to the appropriate systems within the device services environment 910. Likewise, when systems within the device services environment 910 attempt to communicate data instructions to the devices 930, the gateway server 940 routes those requests to the correct device 930.

The gateway server 940 may be adapted to communicate with varied devices 930 using various different computing and communication capabilities. For example, the gateway server 940 may be adapted to communicate using either TCP (Transmission Control Protocol) or UDP (User Datagram Protocol) protocols. Likewise, the gateway server 940 may be programmed to receive and communicate with the devices 930 using any suitable protocol including, for example, MQTT (Message Queue Telemetry Transport), CoAP (Constrained Application Protocol), HTTP (Hypertext Transfer Protocol), and HTTPS (HTTP secure). The gateway server 940 may be programmed to convert the data and instructions or publication messages received from the devices 930 into a format that may be used by other server systems comprised in the device services environment 910. In one example, the gateway server 940 may be adapted to convert a publication message received using the HTTPS protocol into a JSON (JavaScript Object Notation) formatted publication message that is suitable for communication to other servers within the device services environment 910.

The gateway server 940 may store, or may control the storing, of information regarding the devices 930 that have formed a connection to the particular gateway server 940 and for which the particular gateway server 940 may be generally relied upon for communications with the device 930. In one example, the gateway server 940 may have stored thereon information specifying the particular device 930 such as a device identifier. For each connection established from the particular device 930, the gateway server 940 may also maintain information identifying the connection. For example, a connection identifier may be generated and stored for each connection established with a particular device 930. Information relating to the particular connection may also be stored. For example, information identifying the particular socket of the gateway server 940 on which the connection was established, as well as information identifying the particular protocol used by the device 930 on the connection may be stored by the gateway server 940. Information such as the socket and protocol may be used in order to facilitate further communications via the particular connection.

In one example, the gateway server 940 may communicate via any suitable networking technology with a device registry server 942. The device registry server 942 may be adapted to track the attributes and capabilities of each device 930. In an example, the device registry server 942 may be provisioned with information specifying the attributes of the devices 930. The device registry server 942 may comprise data specifying rules or logic (e.g., automation rules) for handling various requests that may be received from the devices 930. The device registry server 942 may be programmed to convert specialized device functions or commands received in particular communication protocols such as, for example HTTPS, MQTT, CoAP, into functions or commands using particular protocols that are understood by other of the servers in the device services environment 910. In one example, the device registry server 942 may be provisioned with information specifying that upon receipt of a particular request from a particular device 930, a request should be made to store the payload data of the request in a particular network service server 950. The device registry server 942 may be similarly programmed to receive requests from servers 942, 950 and convert those requests into commands and protocols understood by the devices 930.

The device security server 946 maintains security-related information for the devices 930 that connect to the device services environment 910. In one example, the device security server 946 may be programmed to process requests to register devices 930 with the device services environment 910. For example, entities such as device manufacturers, may forward requests to register devices 930 with the device services environment 910. The device security server 946 receives registration requests and assigns unique device identifiers to devices 930 which use the device identifiers on subsequent requests to access the device services environment 910. The device security server 946 stores, for each registered device, authentication information that may be provided during the device registration process. For example, a request to register a device 930 may comprise information identifying the device 930 such as a device serial number and information for use in authenticating the device 930. In one example, the information may comprise a digital certificate and may comprise a public key of a public key-private key pair. The information may be stored in relation to the assigned device identifier for the particular device 930. When the device 930 subsequently attempts to access the device services environment 910, the request may be routed to the device security server 946 for evaluation. The device security server 946 determines whether authentication information provided in the request is consistent with the authentication information stored in relation to the device identifier and provided during the registration process.

The device security server 946 may be further programmed to process requests to associate particular entities (individuals or organizations) with particular devices 930. The device security server 946 may be adapted to receive requests to register entities, which may be, for example, individuals, users, accounts, and/or organizations, as authorized to control or communicate with a particular device 930. In one example, a request may be received from an individual or organization that may have purchased a device 930 from a manufacturer. For example, the device may be a dishwasher, thermostat, or lighting assembly that an individual or organization purchased from the manufacturer. The individual or organization may initiate a request to register the device 930 with the individual or an organization with which the organization is associated. The request may be routed to a web services server which may be comprised in the device services environment 910 or which communicates the request to the device services environment 910. The request identifies the device 930 and the particular entity (individual or organization) that is requesting to be associated with the device 930. In one example, the request may comprise a unique device identifier that was assigned when the device 930 was registered with the system. The request further may comprise information uniquely identifying the entity that is registering as having authority to communicate with and/or control the particular device 930.

The device security server 946 stores the information identifying the particular entity in relation with the device identifier. When the particular entity subsequently attempts to control or communicate data to the particular device 930, the device security server 946 may use the information to confirm that the particular entity is authorized to communicate with or control the particular device 930. When an entity that has not been registered as being authorized to communicate with the device 930 attempts to communicate with or control the device 930, the device security server 946 may use the information stored in the device security server 946 to deny the request.

A network services server 950 may be any resource or processing server that may be used by any of servers 940, 942, 946, or 970 in processing requests from the devices 930. In one example, network services server 950 may provide a credential provisioning service that provides network credentials to devices 930 via a device 930 acting as a configurator device. In an example scenario, the network services server 950 may be any of numerous network accessible services including, for example, web or cloud-based services. In one example, the network services server 950 may be programmed to provide particular processing for particular devices 930 and/or groups of devices 930.

Servers 940, 942, 946, 950, and 970 may be communicatively coupled via any suitable networking hardware and software. For example, the servers may communicate via a local area network or wide area network. An external system 960 may access device services environment 910 for any number of purposes. In one example, an external system 960 may be a system adapted to forward requests to register devices 930 with the device services environment 910. For example, an external system 960 may include a server operated by or for a device manufacturer that sends requests to device services environment 910, and device security server 946 in particular, to register devices 930 for operation with device services environment 910. Similarly, the external system 960 may be a system operated to provide a gateway for entities (individuals or organizations) to register an ownership or control relationship with a particular device 930.

The devices 930 may be any devices that may be communicatively coupled via a network 920 with the device services environment 910. For example, the devices 930 may be computing devices such as smart phones and tablet computers, automobiles, appliances such as washers and driers, industrial sensors, switches, control systems, etc. In one example, each of the devices 930 may communicate over the network 920 to store data reflecting the operations of the particular device 930 and/or to request processing provided by, for example, network services server 950. While FIG. 9 depicts three devices 930, it will be appreciated that any number of devices 930 may access the device services environment 910 via the gateway server 940. Further it will be appreciated that the devices 930 may employ various different communication protocols. For example, some devices 930 may transport data using TCP, while others may communicate data using UDP. Some devices 930 may use MQTT, while others may use CoAP, and still others may use HTTPs. It will also be appreciated that each of devices 930 may be programmed to send and receive particular functions or commands in its requests that are not compatible with other devices or even the systems within device services environment 910. The gateway server 940 may be programmed to receive and, if needed, convert such requests for processing with the device services environment 910.

Figure 10:
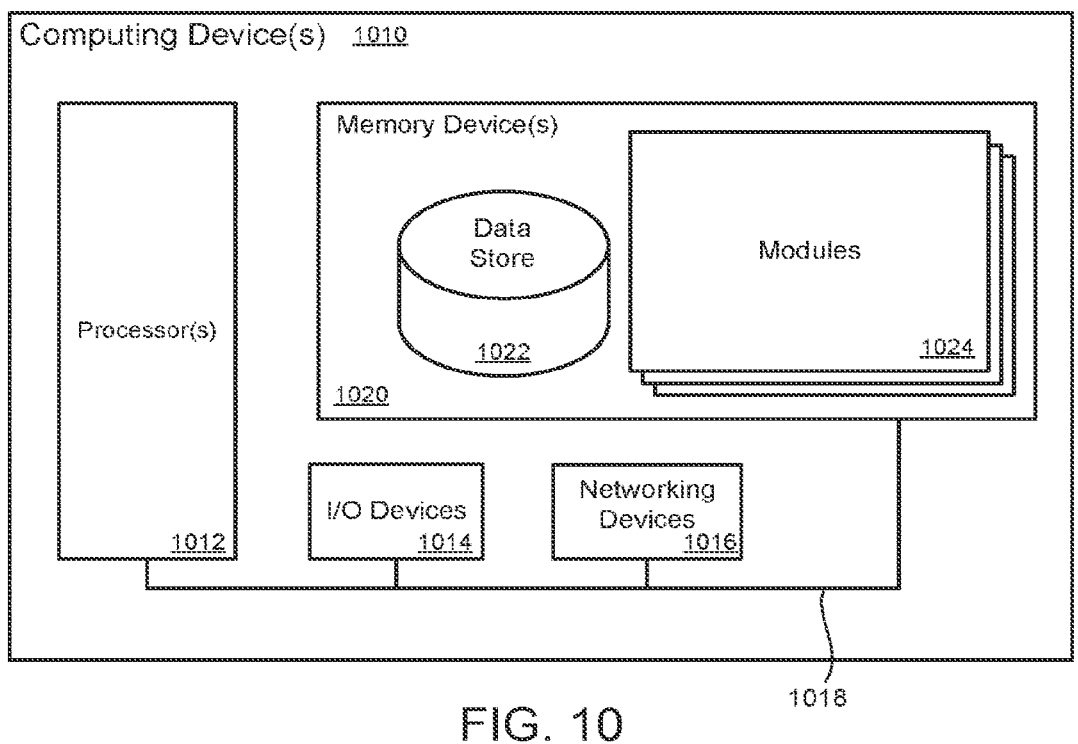
FIG. 10 is block diagram illustrating an example of a computing device that may be used to execute a method for connecting unconfigured devices to a wireless network using network credentials obtained via a configurator device.

FIG. 10 illustrates a computing device 1010 on which modules of this technology may execute. A computing device 1010 is illustrated on which a high-level example of the technology may be executed. The computing device 1010 may include one or more processors 1012 that are in communication with memory devices 1020. The computing device 1010 may include a local communication interface 1018 for the components in the computing device. For example, the local communication interface 1018 may be a local data bus and/or any related address or control busses as may be desired.

The memory device 1020 may contain modules 1024 that are executable by the processor(s) 1012 and data for the modules 1024. In on example, the memory device 1020 may include modules for a credential provisioning service. In another example, the memory device 1020 may include modules for a configurator service. The modules 1024 may execute the functions described earlier. A data store 1022 may also be located in the memory device 1020 for storing data related to the modules 1024 and other applications along with an operating system that is executable by the processor(s) 1012. Other applications may also be stored in the memory device 1020 and may be executable by the processor(s) 1012. Components or modules discussed in this description that may be implemented in the form of software using high-level programming languages that are compiled, interpreted or executed using a hybrid of the methods.

The computing device 1010 may also have access to I/O (input/output) devices 1014 that are usable by the computing device 1010. Networking devices 1016 and similar communication devices may be included in the computing device 1010. The networking devices 1016 may be wired or wireless networking devices that connect to the internet, a LAN, WAN, or other computing network.

The components or modules 1024 that are shown as being stored in the memory device 1020 may be executed by the processor(s) 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory device 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting, or for similar reasons.

Some of the functional units described in this specification have been labeled services, which can be implemented as modules. A module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media.

Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A device, comprising:
   at least one processor; and
   a memory including instructions that, when executed by the at least one processor, cause the device to:
   connect to a wireless network using user provided network credentials for the wireless network, wherein the device connects to the wireless network as part of executing primary functionality of the device;
   in response to receiving instructions from a credential provisioning service to activate a configurator service, activate the configurator service hosted on the device, wherein the configurator service allows unconfigured devices within wireless communication range of the device to connect to the device and obtain the network credentials for the wireless network, wherein the configurator service is executed in conjunction with the primary functionality of the device, and the device is selected by the credential provisioning service to activate a server mode of the configurator service based in part on computing attributes of the device and a physical location of the device within a device network, wherein the server mode of the configurator service allows the device to obtain the network credentials for the wireless network and provide the network credentials to an unconfigured device not yet configured to connect to the wireless network;
   receive, while the device is executing in server mode, a connection request from an unconfigured device to obtain the network credentials that enable the unconfigured device to connect to the wireless network;
   send configurator authentication information to the unconfigured device to enable the unconfigured device to authenticate the device as a configurator device;
   authenticate the unconfigured device using device authentication information received from the unconfigured device;
   obtain the network credentials from the credential provisioning service hosted in the service provider environment; and
   send the network credentials to the unconfigured device to enable the unconfigured device to connect to the wireless network.

2. The device as in claim 1, wherein the memory further includes instructions that, when executed by the at least one processor, cause the device to broadcast a pre-defined default configurator identifier which is detectable by the unconfigured devices within the wireless communication range of the device, wherein the unconfigured devices are configured to search for the pre-defined default configurator identifier and connect to the device.

3. The device as in claim 1, wherein the memory further includes instructions that, when executed by the at least one processor, cause the device to send the device authentication information received from the unconfigured device to the credential provisioning service hosted in the service provider environment for validation of the authentication information.

4. The device as in claim 1, wherein the memory further includes instructions that, when executed by the at least one processor, cause the device to:
   determine that a connection request has not been received for an amount of time; and
   deactivate the configurator service.

5. The device as in claim 1, wherein the memory further includes instructions that, when executed by the at least one processor, cause the device to:
  determine that the network credentials have been received by the unconfigured device;
  deactivate the server mode of the configurator service and maintain the connection to the wireless network as part of executing the primary functionality of the device; and
  in response to receiving subsequent instructions from the credential provisioning service to activate the configurator service, reactivate the configurator service hosted on the device.

6. A computer implemented method, comprising:
  in response to receiving an instruction to activate a configurator service hosted on a device, wherein the activated configurator service acts as a configurator device and provides network credentials of a wireless network to an unconfigured device, wherein the device is selected to activate the server mode of the configurator service based in part on computing attributes of the device and a physical location of the device within a device network, wherein the server mode of the configurator service allows the device to obtain the network credentials for the wireless network and provide the network credentials to an unconfigured device not yet configured to connect to the wireless network;
  receiving, at the device executing in server mode, a connection request from an unconfigured device, executing in the client mode, to obtain network credentials to enable the unconfigured device to connect to a wireless network, wherein the device hosts a configurator service to allow the device to act as a configurator device and provide the network credentials of the wireless network to the unconfigured device;
  determining that the unconfigured device is authorized to connect to the wireless network;
  obtaining the network credentials from a credential provisioning service; and
  sending the network credentials to the unconfigured device to enable the unconfigured device to connect to the wireless network.

7. The method as in claim 6, further comprising receiving the instruction to activate the configurator service from the credential provisioning service.

8. The method as in claim 6, further comprising executing certificate based authentication between the configurator device and the unconfigured device.

9. The method as in claim 6, further comprising:
  requesting a device certificate for the unconfigured device from the credential provisioning service; and
  authenticating the unconfigured device using the device certificate.

10. The method as in claim 6, further comprising:
  receiving device authentication information from the unconfigured device; and
  sending the device authentication information to the credential provisioning service for authentication to allow the credential provisioning service to provide the network credentials.

11. The method as in claim 6, wherein sending the network credentials to the unconfigured device further comprises sending encrypted network credentials that have been encrypted using a device certificate associated with the unconfigured device.

12. The method as in claim 6, wherein sending the network credentials to the unconfigured device causes the unconfigured device to register with the credential provisioning service after connecting to the wireless network, and the credential provisioning service maintains a device registry indicating which devices are included in a device network.

13. The method as in claim 12, wherein the credential provisioning service determines that a registered device is eligible to execute the configurator service based in part on attributes of the registered device, and marks the registered device as eligible to execute the configurator service.

14. The method as in claim 6, further comprising:
  receiving new network credentials from the credential provisioning service, wherein the new network credentials are received in association with a network credentials rotation;
  connecting to the wireless network using the new network credentials; and
  sending the new network credentials to the unconfigured device in response to connection requests from the unconfigured devices to obtain the new network credentials.

15. The method as in claim 6, further comprising receiving a connection request from the unconfigured device to obtain new network credentials as part of a determination that the network credentials for the wireless network are no longer valid.

16. The method as in claim 6, further comprising receiving new network credentials at a plurality of devices with an active configuration service within a device network to increase distribution speed of the new network credentials to the unconfigured devices included in the device network.

17. A device, comprising:
  at least one processor; and
  a memory including instructions that, when executed by the at least one processor, cause the device to:
    detect a configurator device executing a configurator service, wherein the configurator device is selected in response to receiving instructions from a credential provisioning service to activate the configurator service hosted on the configurator device, and based in part on computing attributes of the configurator device and a physical location of the configurator device within a device network, and the configurator service hosted on the configurator device is used to obtain network credentials for a wireless network and provide the network credentials to unconfigured devices not yet configured to connect to the wireless network, and the configurator service is executed on the configurator device in conjunction with executing primary device functionality;
    send a connection request to the configurator device executing the configurator service to obtain the network credentials that enable an unconfigured device to connect to the wireless network;
    receive configurator authentication information from the configurator device;
    authenticate the configurator device as a configurator using the configurator authentication information;
    receive the network credentials obtained from the credential provisioning service hosted in a service provider environment by the configurator device; and
    connect to the wireless network using the network credentials.

18. The device as in claim 17, wherein the memory further includes instructions that, when executed by the at least one processor, cause the device to:

detect a first configurator and a second configurator device executing the configurator service;

determine whether the first configurator or the second configurator devices provide a stronger wireless network signal; and select one of the first configurator or the second configurator devices that provides the stronger wireless network signal with which to connect.

19. The device as in claim 17, wherein the memory further includes instructions that, when executed by the at least one processor, cause the device to:

detect configurator identifiers included in a series of configurator identifiers broadcast by a group of configurator devices, wherein each configurator device in the group of configurator devices broadcasts a configurator identifier included in the series of configurator identifiers;

select a configurator identifier included in the series of configurator identifiers to send the connection request to a configurator device associated with the configurator identifier; and select a next configurator identifier in the series of configurator identifiers when a connection to the configurator device is unsuccessful.

20. The device as in claim 17, wherein the memory further includes instructions that, when executed by the at least one processor, cause the device to decrypt the network credentials received from the configurator device using an encryption key preinstalled on the device.

21. The device as in claim 17, wherein the memory further includes instructions that, when executed by the at least one processor, cause the device to send a message to the credential provisioning service hosted in the service provider environment indicating that the device has been successfully configured to connect to the wireless network.

22. The device as in claim 17, wherein the memory further includes instructions that, when executed by the at least one processor, cause the device to:

determine that the network credentials for the wireless network are no longer valid; and identify the configurator device executing the configurator service to obtain valid network credentials for the wireless network.

* * * * *